(12) United States Patent
Juen et al.

(10) Patent No.: US 7,741,785 B2
(45) Date of Patent: Jun. 22, 2010

(54) METHOD AND DEVICE FOR DIMMING LIGHTING CONTROL DEVICES TO A PREDEFINED LEVEL

(75) Inventors: Reinhold Juen, Dornbirn (AT); Joachim Maier, Dornbirn (AT)

(73) Assignee: TridonicAtco GmbH & Co KG, Dornbirn (AT)

( * ) Notice: Subject to any disclaimer, the term of this patent is extended or adjusted under 35 U.S.C. 154(b) by 239 days.

(21) Appl. No.: 11/779,623

(22) Filed: Jul. 18, 2007

(65) Prior Publication Data

US 2007/0268152 A1 Nov. 22, 2007

Related U.S. Application Data

(63) Continuation of application No. PCT/EP2006/000144, filed on Jan. 10, 2006.

(30) Foreign Application Priority Data

| Jan. 21, 2005 | (DE) | .................. 10 2005 002 973 |
| Feb. 28, 2005 | (DE) | .................. 10 2005 008 996 |

(51) Int. Cl.
*H05B 37/00* (2006.01)
(52) U.S. Cl. ................... 315/149; 315/159; 315/294; 315/DIG. 4
(58) Field of Classification Search ............ 315/DIG. 4, 315/149–159, 294, 307
See application file for complete search history.

(56) References Cited

U.S. PATENT DOCUMENTS

| 5,327,048 A | 7/1994 | Troy .......................... 315/240 |
| 5,519,289 A | 5/1996 | Katyl et al. ................. 315/224 |
| 5,637,964 A | 6/1997 | Hakkarainen et al. ....... 315/295 |
| 6,388,396 B1 * | 5/2002 | Katyl et al. ................. 315/294 |
| 2003/0222588 A1 | 12/2003 | Myron et al. ............... 315/159 |

FOREIGN PATENT DOCUMENTS

EP         0 734 197 B1      9/1996

OTHER PUBLICATIONS

Cecilia Conteni, XP-010583030, "Digitally Addressable DALI Dimming Ballast", Applied Power Electronics Conference and Exposition, Seventeenth Annual IEEE conference, vol. 2, pp. 936-942 (2002).
International Preliminary Examination Report for PCT/EP2006/000144, Apr. 1, 2008.

* cited by examiner

*Primary Examiner*—David Hung Vu
(74) *Attorney, Agent, or Firm*—Winston & Strawn LLP

(57) ABSTRACT

A method for driving an electronically controlled lighting means operating device, by evaluating an output signal of a motion sensor which is connected to a supply voltage and outputs the supply voltage as an output signal as a function of the detection of a motion, and setting the electronically controlled lighting means operating device to one of a plurality of predetermined dimming levels as a function of an output signal of the motion sensor. At least one of the predetermined dimming levels is programmed or the output signal of the motion sensor is detected at a control input of a digital interface of the operating device.

20 Claims, 2 Drawing Sheets

METHOD AND DEVICE FOR DIMMING LIGHTING CONTROL DEVICES TO A PREDEFINED LEVEL

CROSS-REFERENCE TO RELATED APPLICATIONS

Figure 1:
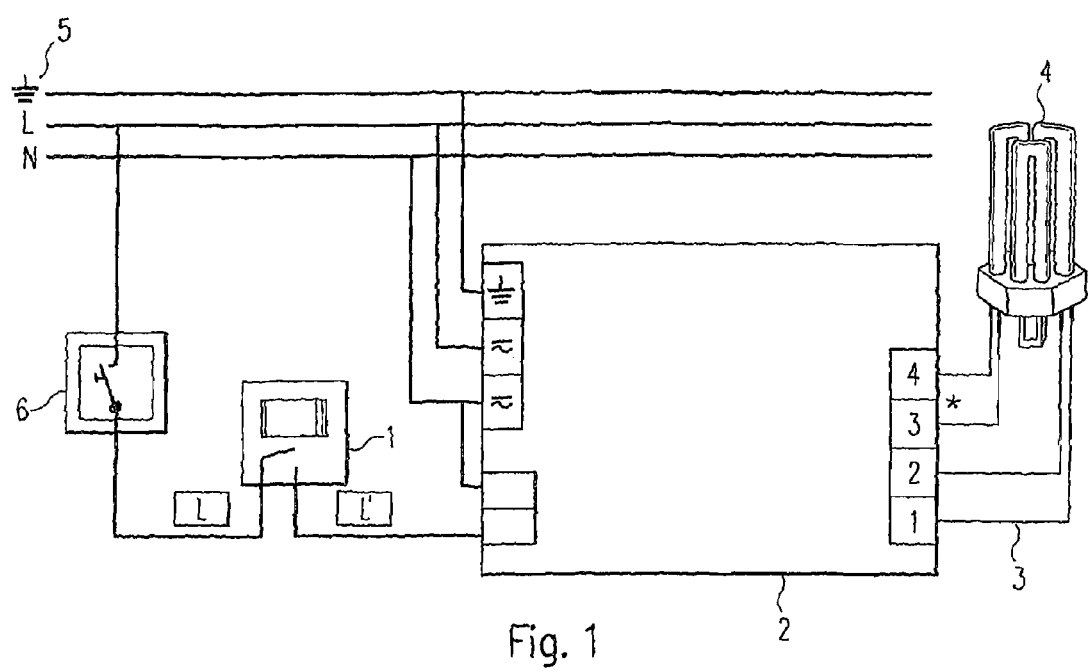

This application is a continuation of International application PCT/EP2006/000144 filed Jan. 10, 2006, the entire content of which is expressly incorporated herein by reference thereto.

BACKGROUND

The present invention relates in general to methods and devices by means of which lighting means, such as LEDs, gas-discharge lamps, high-pressure lamps etc. can be controlled and/or regulated to previously defined dimming levels (dimming stages). Such electronic operating devices are generally known as an electronic ballast (EB) in the sector of gas-discharge lamps.

It is known from the prior art to drive, for example, such electronic ballasts (EBs), in order to cite only one example of lighting means operating devices, via a digital bus. In this regard, reference is made to the literature in connection with the so-called DALI (digital addressable light interface) standard. In this case, digital signals are therefore fed to a lighting means operating device at a control input, which signals can predetermine, inter alia, desired dimming values.

Since a user does not always desire to use the associated bus device including a digital controller for a lighting means operating device with such a digital interface, as well, operating devices are also known from the prior art in which either even a digital signal or else a signal produced by means of a pushbutton supplied with mains voltage can be applied to such a digital control input (digital interface). In this case, a user who does not wish to go beyond the digital periphery, can therefore drive the digital control input of the operating device by means of actuating the pushbutton. In the process, for example, the duration and the repetition rate of the actuation of the pushbutton is evaluated by the connected operating device as a signal for connection/disconnection or for dimming. An example of such an operating device, to whose digital control input a signal originating from a pushbutton or switch supplied with mains voltage can also be applied, is mentioned, for example, in the German utility model DE 297 24 657.

Despite this device, improvements in this area are still desired.

SUMMARY OF THE INVENTION

The present invention now transfers the knowledge that signals produced by means of a mains voltage can also be applied to a digital control input of a lighting means operating device given a corresponding design, which knowledge is obtained from the sector of pushbuttons and switches, to other sectors. In this process, the invention has in particular identified that such an approach can also be transferred to the sector of motion detection by means of a motion sensor.

In particular, the invention relates to a method for driving electronically controlled lighting means operating devices. A typical example of such a lighting means operating device is an electronic ballast (EB) for gas-discharge lamps. According to the invention, an output signal of a motion sensor, which is connected to a supply voltage, is evaluated. Then, the electronically controlled lighting means operating device is set to one of a plurality of predetermined dimming levels as a function of the output signal of the motion sensor.

The output signal of the motion sensor can in this case be detected in a control input of the operating device which is provided isolated from the voltage supply of the lighting means operating device. In this case, the control input may be designed such that either a digital signal or a mains voltage signal can be applied to it.

In accordance with a further aspect of the present invention, a method for driving electronically controlled lighting means operating devices is provided, with at least two different dimming stages (dimming levels) being preprogrammed in advance in a lighting means operating device. Then, selectively one of the two dimming stages is set as a function of a control signal, which is fed to the lighting means operating device. Both dimming stages in this case indicate a luminous efficiency of more than 0%.

In accordance with yet a further aspect of the present invention, a method for driving electronically controlled lighting means operating devices is provided, in which a motion is detected in a defined area. If a motion is positively detected, starting from a quiescent value, the lighting means operating device is set to a desired operational value, which is different than the quiescent value, the desired operational value indicating a greater luminous efficiency of the connected lighting means in comparison with the quiescent value.

In this case, the desired operational value can be maintained automatically over a defined period of time before the quiescent value is set again. The quiescent value and/or the desired operational value can in this case be capable of being adjusted or programmed. In this case, if desired, the quiescent value can be adjusted to a value of more than 0% luminous efficiency.

The invention also relates to a computer software programming product which supports the previously described methods whether running on a computing device or implemented by means of hard-wiring.

The invention further relates to an operating means for lighting means which is designed to carry out such a method. Such means may be in the form of a lighting means operating device which has a control input. In this case, two different dimming levels are stored in the operating device which are each greater than 0% and to which a connected lighting means is controlled and/or regulated as a function of a signal applied to the control input.

In this case, the control input can be designed such that either a digital signal with a first voltage level or a signal originating from a mains voltage with a level which is different than the first voltage level can be applied. The two mentioned types of signal can be evaluated by the operating device and converted for driving a connected lighting means.

The invention also relates to a system for driving electronically controlled lighting means operating devices, the system having a motion sensor, which is connected to a supply voltage, and a lighting means operating device. The lighting means operating device has a control input, to which an output signal of the motion sensor can be fed. In this case, the lighting means operating device can set a connected lighting means automatically to a higher luminous efficiency in response to a motion detected by the motion sensor.

Yet a further aspect of the present invention relates to a system for driving lighting means which has a motion sensor and a lighting means operating device connected thereto. The lighting means operating device sets a connected lighting means to a desired operational value, which is different than the quiescent value, if a motion is detected in a defined area by the motion sensor. In this case, the desired operational value is higher than a quiescent value.

The lighting means operating device can in particular be an electronic ballast (EB).

BRIEF DESCRIPTION OF THE DRAWING FIGURES

Further advantages, features and properties of the present invention will now be explained with reference to the single figure of the drawings attached as an annex.

Figure 2:
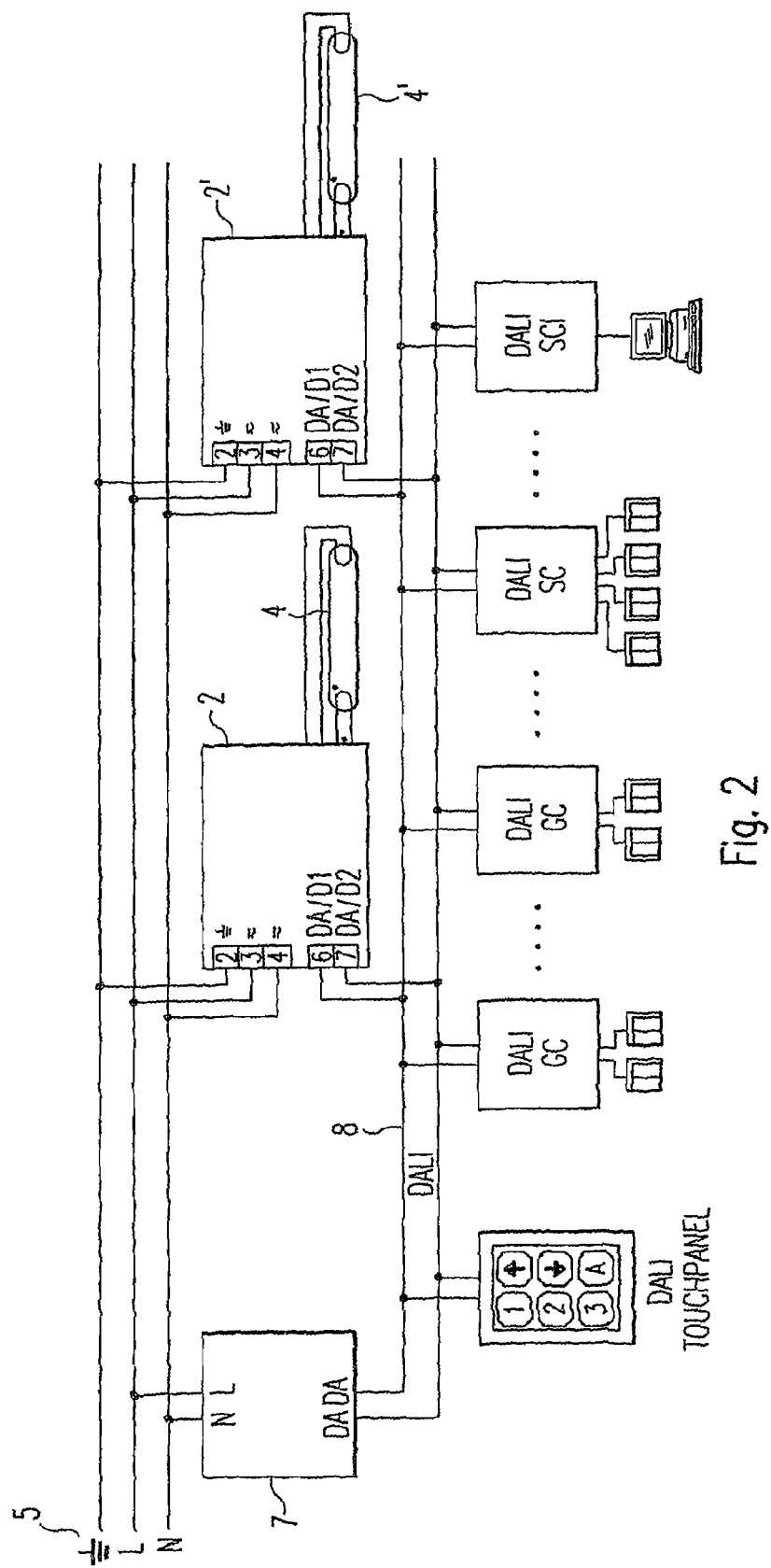

FIG. 1 shows a first system according to the invention for driving a lighting means, and FIG. 2 shows a further exemplary embodiment, in which a motion sensor communicates with a lighting means operating device via a digital bus.

DETAILED DESCRIPTION OF THE PREFERRED EMBODIMENTS

FIG. 1 schematically illustrates a motion sensor 1, which is known in principle, an electronic ballast (EB) 2 and two connected lighting means 4 at the output 3 of the EB. Mention has already been made of the fact that the EB 2 only represents one example of an operating device for lighting means and the present invention can freely be applied to any other desired lighting means and therefore beyond gas-discharge lamps.

The EB 2 illustrated has three terminals PE, L, N, which can be connected to ground, to the phase and to the neutral conductor of a voltage supply 5. Furthermore, the illustrated EB also has an interface having two terminals D1, D2. This interface D1, D2, as can already be seen from the brief designation of the terminals, can be designed such that its digital signals are fed, for example, in accordance with the DALI standard in order to transmit commands to the EB 2 or in order to transmit commands at these terminals from the EB 2 to a connected bus, such as the DALI bus, for example, if a bidirectional communication is provided.

Optionally, the terminals D1, D2 can therefore also be designed to receive digital commands with subsequent signal processing. In any case, the claims D1, D2 are designed such that signals can be applied to them which originate from a supply voltage, such as the mains voltage, for example. In the example illustrated, the terminal D2 is connected to the neutral conductor N of the voltage supply 5.

A conventional motion sensor 1 is connected between the other signal control input D1 of the EB 2 and the phase conductor L of the voltage supply 5 (the function of the optional timer 6, which is likewise connected therebetween, will be explained hereinbelow). The phase L of the supply voltage 5 is therefore fed to this motion sensor 1 on the input side. The output signal of the motion sensor 1, which is therefore fed to the control input D1 of the EB 2, is denoted by L'.

Essentially two different signals can therefore be applied to the control input D1, namely one for the case in which a motion is detected by the motion sensor 1 and a signal, which is different than this, for the case in which the motion sensor 1 does not identify a motion. In particular, these two signal states, which correspond to the output signal of the motion sensor, can be defined in the following paragraphs.

When a motion is detected by the motion sensor 1, it closes the connection between the phase conductor L and the control input D1, with the result that the signal level of the phase conductor L is applied to the control input D1. In the EB 2, a defined dimming level is stored in advance which is set by the EB 2 if the detection of a motion by the motion sensor 1 is reproduced by the phase conductor L being connected to the control input D1.

On the other hand, if the motion sensor 1 does not identify any motion in the range monitored by it, in accordance with this exemplary embodiment the connection between the control input D1 and the phase conductor L of the voltage supply 5 is isolated, with the result that no voltage is applied to the control input D1. For this case, which can therefore be interpreted by the EB 2 as no motion having been identified, a second dimming value can be preprogrammed in the EB 2 which will be referred to below as the quiescent value corresponding to a motion not having been identified. This quiescent value may in particular be a lower dimming level in comparison with the desired operational value in the event of a motion being identified.

Typical applications for such a system for driving lighting means are, for example, stairwells or corridors. Advantageously, in this case no further control units are required in addition to the lighting means operating device and the motion sensor.

If a motion is identified by the motion sensor 1 and, as a result, for example the mains voltage is applied to the control input D1 of the EB 2, said EB 2 can, for example, set a connected lighting means automatically to 100% luminous efficiency. If, on the other hand, no motion is identified, and thus the signal '0' is applied to the control input D1 (no voltage), the lighting means can be controlled to a lower value such as, for example, 5% luminous efficiency. If, therefore, the motion sensor identifies the presence of a person, for example in a stairwell, this stairwell is automatically illuminated with sufficient luminous efficiency, for example 100%.

After a predetermined period of time, which can be programmed or adjusted, for example, in the EB 2 or else corresponds to the (again possibly adjustable) delay time of the motion sensor 1 after identification of a motion, the motion sensor again interrupts the connection to the control phase L. The connected lighting means is therefore set to the quiescent value again, which corresponds to a substantially lower level in comparison with the desired operational value. And as stated, both the quiescent value and the desired operational value on detection of a motion can be capable of being adjusted or programmed using the EB 2.

Provision may furthermore be made for a timer 6 to also be connected in series, in addition to the motion sensor, which timer predetermines time spans of use (for example mornings, evenings, dusk, etc.) in which the function of the motion sensor is switched to be active. The timer therefore only connects the control phase L to the motion sensor within the time span of use, with the result that the motion sensor can in turn only produce a connection between the control input D1 and the control phase L during the time span of use.

These time spans of use, however, can also be adjusted in the operating device or in the motion sensor itself, for example. Adjusting the two dimming levels (quiescent value, desired operational value) can take place, for example, via an interface. This can be carried out during operation, during installation, during manufacture etc. The interface can also have a wire-free design.

The EB can also be designed to automatically identify the connection of a motion sensor. This is advantageous, for example, when the EB is one which has a continuous dimming range or a virtually continuous dimming range of, for example, from 1% to 100%, which automatically switches over to a two dimming level operation when the connection of a motion sensor to the terminals D1, D2 is identified. A typical application is therefore the identification of people at certain periods of time (during the morning, during the evening) in a stairwell etc.

FIG. 2 illustrates the fact that a motion sensor 7 may also be an element of a digital bus system (for example in accordance with the DALI standard). In this case, the motion sensor 7 can transmit the information on the detection of a motion in the form of a digital signal via a bus line 8 to connected operating devices 2, 2'. This information, as provided, for example, in the DALI standard, can be addressed and one or a group of connected operating devices with lighting means 4, 4' respond with the corresponding address.

In addition, the digital controllers (DALI GC, DALI SC), control elements (DALI touchpanel) and interfaces (DALI SCI) which are conventional in the DALI system can naturally also be connected, for example. Programming of the above-described levels and periods of time can take place, for example, via these interfaces.

What is claimed is:

1. A method for driving an electronically controlled lighting means operating device, which comprises:
   evaluating an output signal of a motion sensor which is connected to a supply voltage and outputs the supply voltage as an output signal as a function of the detection of a motion, and
   setting the electronically controlled lighting means operating device to one of a plurality of predetermined dimming levels as a function of an output signal of the motion sensor,
   wherein the output signal of the motion sensor is detected at a control input of a digital interface of the operating device and the motion sensor is supplied with the supply voltage independent from the operating device.

2. The method of claim 1, wherein the output signal of the motion sensor is detected at the control input of the operating device which is provided isolated from the supply voltage of the lighting means operating device.

3. The method of claim 2, wherein either a digital signal or a signal originating from the supply voltage is applied to the control input.

4. The method of claim 2, wherein either a digital signal or a signal originating from a mains voltage is applied to the control input.

5. The method of claim 1, which further comprises:
   advance-programming two different dimming stages in a lighting means operating device, and
   selectively setting one of the two dimming stages as a function of a control signal which is forwarded to control the lighting means operating device.

6. The method of claim 1, which further comprises:
   detecting a motion in a defined area, and
   for the case of the detection of a motion starting from a quiescent value, setting the lighting means operating device to a desired operational value which is different than the quiescent value and indicates a greater luminous efficiency of the connected lighting means in comparison with the quiescent value, it being possible for the quiescent value or the desired operational value to be programmed.

7. The method of claim 6, wherein the desired operational value is maintained over a defined period of time before the quiescent value is re-set.

8. The method of claim 7, wherein the defined period of time for maintaining the desired operational value can be adjusted or programmed.

9. The method of claim 7, wherein the quiescent value or the desired operational value can be adjusted.

10. The method of claim 9, wherein the quiescent value is adjusted to a value of more than 0% luminous efficiency.

11. The method of claim 6, wherein an operating device which is capable of setting more than two dimming levels identifies the connection of a motion sensor and converts to operation with only two dimming levels.

12. A computer software programming product for supporting the method of claim 1, when running on a computing device of an operating device.

13. An operating system for lighting means, comprising hardware for operating the software of claim 12.

14. The method of claim 1, wherein the lighting means operating device has the control input and comprises two different dimming levels stored in the operating device which are each greater than 0% and to which a connected lighting means is controlled or regulated as a function of a signal applied to the control input, wherein at least one of the dimming levels is programmed.

15. The method of claim 1, wherein the lighting means operating device has the control input and comprises two different dimming levels being stored in the operating device which are each greater than 0% and to which a connected lighting means is controlled or regulated as a function of a signal applied to the control input, the control input being part of a digital interface.

16. The method of claim 14, wherein the operating device applies either a digital signal with a first voltage level or a signal originating from a mains voltage with a level which is different than the first voltage level to the control input, and such that the signal can be converted by the operating device for driving a connected lighting means.

17. The method of claim 16, wherein the operating device has more than two dimming levels which switches over to operation with two defined dimming levels when a motion sensor is connected.

18. The method of claim 17, designed to maintain the desired operational value over a defined period of time before it again sets the quiescent value.

19. The method of claim 14, wherein the operating device also includes the motion sensor and the motion sensor is connected to a supply voltage and is connected to a control input of the lighting means operating device, such that a connected lighting means is set to a higher luminous efficiency in response to a motion detected by the motion sensor.

20. The method of claim 1, wherein at least one of the predetermined dimming levels is programmed.

* * * * *